United States Patent
Anwar et al.

(10) Patent No.: US 11,934,273 B1
(45) Date of Patent: Mar. 19, 2024

(54) CHANGE-BASED SNAPSHOT MECHANISM

(71) Applicant: Dell Products L.P., Hopkinton, MA (US)

(72) Inventors: Shakil Anwar, Westborough, MA (US); Michael Ferrari, Douglas, MA (US); Daryl Kinney, Hopkinton, MA (US); Subramanian Venkatraman, Bangalore (IN); Nicholas Von Hein, Riverside, RI (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/968,836

(22) Filed: Oct. 19, 2022

(51) Int. Cl.
*G06F 11/14* (2006.01)

(52) U.S. Cl.
CPC ...... *G06F 11/1448* (2013.01); *G06F 2201/84* (2013.01)

(58) Field of Classification Search
CPC .................................................. G06F 11/1448
See application file for complete search history.

(56) References Cited

U.S. PATENT DOCUMENTS

| | | | | |
|---|---|---|---|---|
| 9,329,940 | B2* | 5/2016 | Baptist | G06F 11/1076 |
| 9,547,560 | B1* | 1/2017 | Lee | G06F 3/0665 |
| 10,866,968 | B1* | 12/2020 | Cole | G06F 16/95 |
| 11,036,590 | B2* | 6/2021 | Varley | G06F 11/1451 |
| 11,182,372 | B1* | 11/2021 | Jain | G06F 11/1464 |
| 2014/0279905 | A1* | 9/2014 | Muniswamy-Reddy | G06F 3/0683 707/639 |
| 2017/0357659 | A1* | 12/2017 | Mackovitch | G06F 16/162 |
| 2020/0042396 | A1* | 2/2020 | Desai | G06F 16/128 |
| 2020/0133500 | A1* | 4/2020 | Shang | G06F 16/178 |
| 2020/0409974 | A1* | 12/2020 | Ayzenberg | G06F 16/2246 |
| 2021/0064238 | A1* | 3/2021 | Selvarajan | G06F 3/0608 |
| 2021/0303522 | A1* | 9/2021 | Periyagaram | G06F 16/178 |
| 2021/0357504 | A1* | 11/2021 | Saad | G06F 21/567 |
| 2022/0263897 | A1* | 8/2022 | Karr | G06F 11/1448 |
| 2023/0132591 | A1* | 5/2023 | Karr | G06F 16/128 711/162 |
| 2023/0195578 | A1* | 6/2023 | Lee | G06F 11/1451 707/645 |
| 2023/0385159 | A1* | 11/2023 | Kuchibhotla | G06F 11/1469 |
| 2023/0409206 | A1* | 12/2023 | Kuchibhotla | G06F 3/0659 |

* cited by examiner

*Primary Examiner* — Huawen A Peng
(74) *Attorney, Agent, or Firm* — Anderson Gorecki LLP (57) ABSTRACT

Generation of new snapshots of a storage object are prompted based on changes to the storage object. An absolute storage change condition is satisfied when the aggregate amount of changed data since the most recent snapshot satisfies a threshold that represents a predefined amount of storage capacity, e.g., N GB. A percentage of used storage change condition is satisfied when the aggregate size of the changes expressed as a percentage of the provisioned storage capacity of snapped storage object satisfies a predetermined threshold, e.g., X % of Y TB. A percentage of provisioned storage change condition is satisfied when the aggregate amount of the changes in terms of percentage of utilized storage capacity of storage object satisfies a predetermined threshold expressed as a percentage of the utilized capacity of the storage object, e.g., P % of Z TB.

20 Claims, 6 Drawing Sheets

CHANGE-BASED SNAPSHOT MECHANISM

TECHNICAL FIELD

The subject matter of this disclosure is generally related to data storage systems, and more particularly to creation of snapshots of storage objects.

BACKGROUND

Storage systems such as Storage Area Networks (SANs) and Network-Attached Storage (NAS) can be used to maintain large storage objects that are used by instances of host applications running on host servers to perform important organizational functions. Remote and local copies of the storage object data are typically maintained to help avoid data loss and maintain data availability. Creating complete backup copies of a large storage object at regular time intervals would require a significant amount of time and resources so it is common practice to generate smaller incremental copies known as snapshots or "snaps." Each snapshot of a storage object is an independent storage object, sometimes referred to as a "snap volume," that can be mounted on a storage node. The data in each snap volume may include only the changes made to the larger snapped storage object since some prior point in time but represents the state of the entire snapped storage object. A sequence of snapshots can be used together to recreate the state of the snapped storage object at various discrete prior points in time.

Snapshots are typically created at regular intervals of time in response to commands from host servers. For example, a script running on a host server may periodically generate a command that is sent to a storage system to cause a new snapshot to be created on a remote storage system. The time period between successive snapshots may be selected based in part on the type of data that is being snapped. For example, a new snap may be created every 10 minutes for a storage object that includes databases or Online Transaction Processing (OLTP) data, but only once per day for other types of storage objects.

SUMMARY

The present invention is predicated in-part on recognition that the amount of the changes to a storage object is not typically a simple function of elapsed time, so snapshots generated at regular intervals of time can problematically include more or less changed data than is desirable for a snapshot. The changes, measured in terms of storage capacity, in one time-based snap cycle may be considered larger than desirable if the granularity of protection is insufficient. When granularity is insufficient, reverting the state of a storage object back in time to the last good copy can result in a significant amount of data being lost. In contrast, if the amount of the changes to the data in one time-based snap cycle is smaller than desirable, then a snap will be created with too little changed data to be useful but snap creation will still consume the resources required to create and maintain a new snap volume and associated metadata.

In accordance with some implementations, a method comprises: monitoring changes to a storage object since generation of a most recent snapshot of the storage object; computing that the monitored changes satisfy a change threshold condition for the storage object; and generating a new snapshot of the storage object in response to computing that the monitored changes satisfy the change threshold condition for the storage object. an apparatus comprises:

In accordance with some implementations an apparatus comprises: non-volatile drives with storage space mapped to a storage object; and snapshot generation program logic configured to: monitor changes to the storage object since generation of a most recent snapshot of the storage object; compute that the monitored changes satisfy a change threshold condition for the storage object; and prompt generation of a new snapshot of the storage object in response to a determination that the monitored changes satisfy the change threshold condition for the storage object.

In accordance with some implementations, a non-transitory computer-readable storage medium stores instructions that when executed by a computer cause the computer to perform a method comprising: monitoring changes to a storage object since generation of a most recent snapshot of the storage object; computing that the monitored changes satisfy a change threshold condition for the storage object; and generating a new snapshot of the storage object in response to computing that the monitored changes satisfy the change threshold condition for the storage object.

Although no advantages should be viewed as limitations to the inventive aspects, some implementations enhance resource utilization efficiency by prompting generation of new snaps based on changes rather than a fixed time period. Prompting generation of new snaps based on changes may help to avoid creation of snaps with too little or too much changed data.

Other aspects, features, and implementations may become apparent in view of the detailed description and figures. All examples, aspects and features can be combined in any technically possible way.

DETAILED DESCRIPTION

Aspects of the inventive concepts are described as being implemented in a data storage system that includes a host server and SAN. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Figure 1:
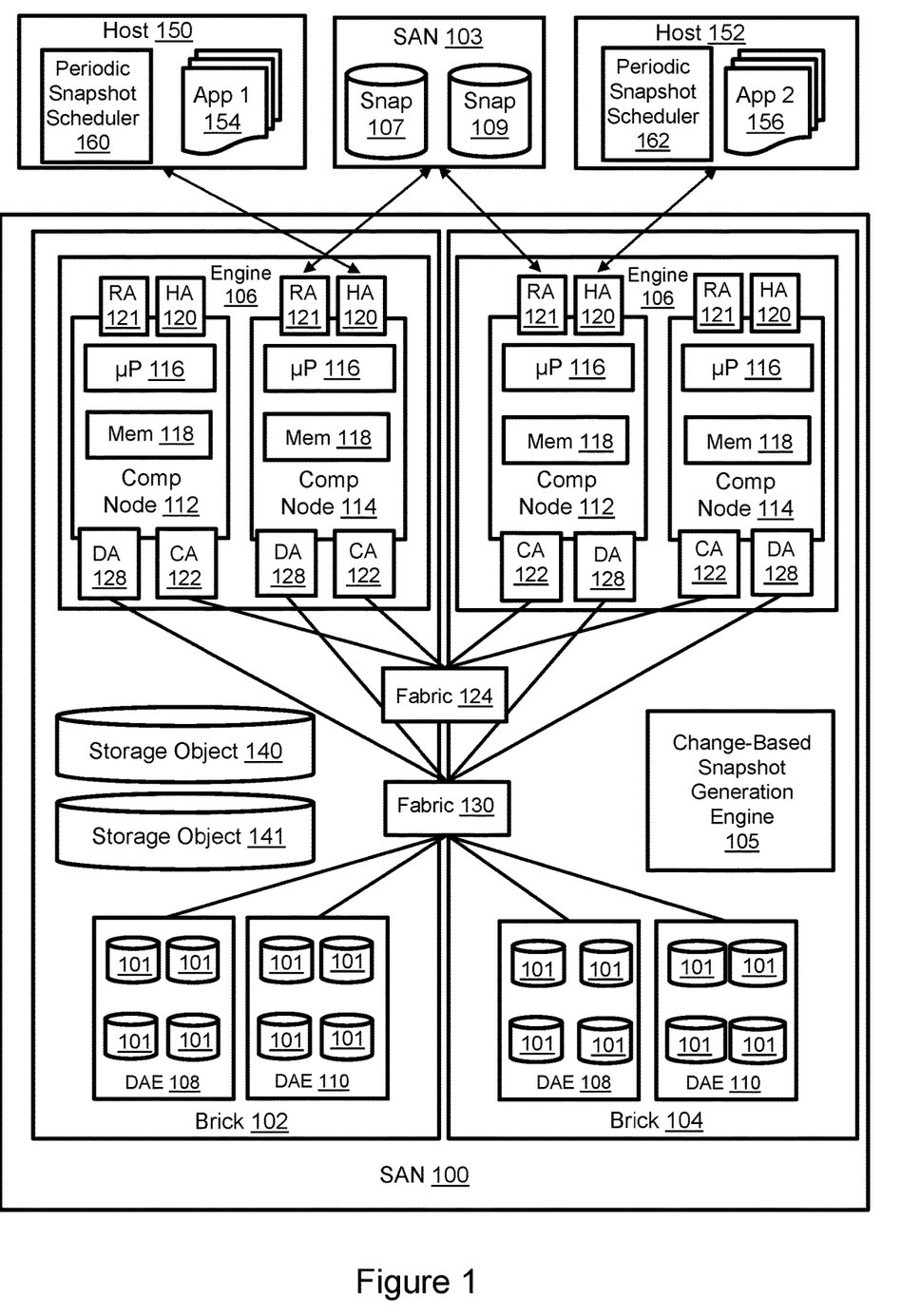
FIG. 1 illustrates a storage system that includes a SAN with a change-based snapshot generation engine.

FIG. 1 illustrates a storage system that includes host servers 150, 152, a remote SAN 103, and a SAN 100 with a change-based snapshot generation engine 105. As will be explained in greater detail below, the change-based snapshot generation engine 105 prompts generation of new snapshots as a function of the amount of changes made to a storage object. Each host, of which there may be many, includes microprocessors and memory for running instances of host applications 154, 156, such as programs for email, inventory control, accounting, manufacturing, engineering, and any of a wide variety of organizational functions. The hosts may include periodic snapshot schedulers 160, 162 that prompt generation of new snaps of a storage object using a single fixed period of time that defines the interval between successive snaps. For example, the periodic snapshot schedulers might be configured to send commands to cause the SAN to generate new snaps at a fixed time interval such as 10 minutes or 24 hours. Although the hosts are depicted as independent servers, the hosts could run in containers or on virtual machines on a SAN.

The SAN 100, which may be referred to as a storage array, includes one or more bricks 102, 104. Each brick includes an engine 106 and one or more drive array enclosures (DAEs) 108, 110. Each DAE includes managed drives 101 of one or more technology types. Examples may include, without limitation, solid-state drives (SSDs) such as flash and hard disk drives (HDDs) with spinning disk storage media. Each DAE might include many more managed drives than illustrated. Each engine 106 includes a pair of interconnected compute nodes 112, 114, which may be referred to as "storage directors." Each compute node includes hardware resources such as at least one multi-core processor 116 and local memory 118. The processor may include Central Processing Units (CPUs), Graphics Processing Units (GPUs), or both. The local memory 118 may include volatile Random-Access Memory (RAM) of any type, Non-Volatile Memory (NVM) such as Storage Class Memory (SCM), or both. Each compute node includes one or more host adapters (HAs) 120 for communicating with the hosts 150, 152. Each HA has hardware resources for servicing IOs, e.g., processors, volatile memory, and ports via which the hosts may access the SAN node. Each compute node also includes a remote adapter (RA) 121 for communicating with other storage systems such as the remote SAN 103. Each compute node also includes one or more drive adapters (DAs) 128 for communicating with the managed drives 101 in the DAEs 108, 110. Each drive adapter has hardware resources for servicing IOs, e.g., processors, volatile memory, and ports via which the computing node may access the DAEs. Each compute node may also include one or more channel adapters (CAs) 122 for communicating with other compute nodes via an interconnecting fabric 124. An operating system (OS) running on the SAN has resources for servicing IOs and supports a wide variety of other functions. Each compute node may allocate a portion or partition of its respective local memory 118 to a shared memory that can be accessed by other compute nodes, e.g., via Direct Memory Access (DMA) or Remote DMA (RDMA). The paired compute nodes 112, 114 of each engine 106 provide failover protection and may be directly interconnected by communication links. An interconnecting fabric 130 enables implementation of an N-way active-active backend. A backend connection group includes all DAs that can access the same drive or drives. In some implementations every DA 128 in the storage array can reach every DAE via the fabric 130. Further, in some implementations every DA in the SAN can access every managed drive 101 in the SAN. The change-based snapshot recommendation engine 105 may include program code stored in the memory 118 of the compute nodes and executed by the processors 116 of the compute nodes.

Data used by instances of the host applications 154, 156 running on the hosts 150, 152 is maintained on the managed drives 101. The managed drives 101 are not discoverable by the hosts 150, 152 but the SAN 100 creates production storage objects 140, 141 that can be discovered and accessed by the hosts. The production storage objects are logical storage devices that may be referred to as production volumes, production devices, or production LUNs, where Logical Unit Number (LUN) is a number used to identify logical storage volumes in accordance with the Small Computer System Interface (SCSI) protocol. From the perspective of the hosts 150, 152, each storage object 140, 141 is a single drive having a set of contiguous fixed-size logical block addresses (LBAs) on which data used by instances of the host application resides. However, the host application data is stored at non-contiguous addresses on various managed drives 101. The data used by an individual host application may be maintained on one storage object that is accessed by all instances of the host application. In the illustrated example, storage object 140 is used by instances of host application 154 for storage of host application data and storage object 141 is used by instances of host application 156 for storage of host application data.

To service IOs from instances of a host application, the SAN 100 maintains metadata that indicates, among various things, mappings between LBAs of the production storage objects 140, 141 and addresses with which extents of host application data can be accessed from the shared memory and managed drives 101. In response to a data access command from an instance of one of the host applications to READ data from storage object 140, the SAN uses the metadata to find the requested data in the shared memory or managed drives. A cache slots partition of the shared memory may be organized into same-size tracks that are used as an allocation unit for IOs between the compute nodes and the managed drives. The tracks are not necessarily the same size as the LBAs of the storage objects. When requested data at an LBA of the storage objects is already present in a track in memory when the command is received it is considered a "cache hit." When the requested data is not in the shared memory when the command is received it is considered a "cache miss." In the event of a cache miss, the track is temporarily copied into the shared memory from the managed drives and used to service the IO, i.e., reply to the host application with the data via one of the computing nodes. An entire track is copied into the shared memory even if the IO from the host is a read to a small part of the track. In the case of a WRITE to an LBA of one of the production volumes, the compute node copies the data into the shared memory, marks the corresponding track as dirty in the metadata, and eventually destages the track to the managed drives.

Remote SAN 103 maintains remote snapshots of the storage objects 140, 141. Snap 107 and snap 109 respectively are snap volumes created for storage objects 140, 141. Each snap is a mountable, consistent point-in-time, persistent storage copy of changes to a snapped storage object such as storage objects 140, 141. Multiple snapshots may be generated over time, and each of those snapshots is an incremental copy that represents the entire snapped storage object but may only contain changes to the snapped storage object since some prior point in time, e.g., and without limitation since creation of the most recent snap of that storage object. For example, a first snap could be created at time t0 and a second snap could be created at time t1, where the second snap includes only the changes to the snapped storage object since the first snap was created, i.e., $\Delta(t1-t0)$. Local snapshots of the storage objects may also or alternatively be created and maintained on SAN 100. Generation of change-based snapshots with engine 105 is described below. An initial remote snapshot may include a full copy of the local storage object.

Figure 2:
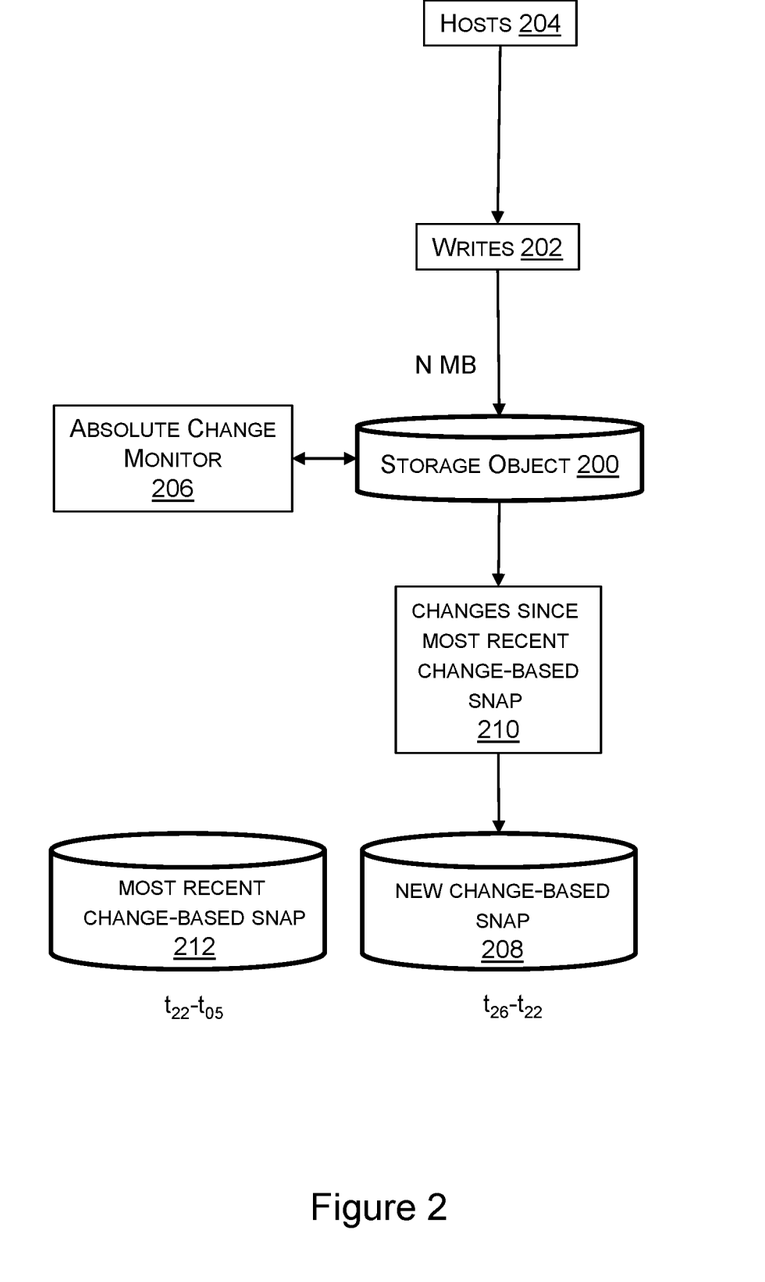
FIG. 2 illustrates snapshot generation based on the amount of changed data in terms of storage capacity used.

FIG. 2 illustrates snapshot generation based on the amount of data changed in terms of storage capacity used for the changed data. A storage object 200 is changed by commands such as write IOs 202 received from hosts 204. An absolute change monitor 206 observes the writes to the storage object 200, computes the aggregate size of the changes, and prompts generation of a new snapshot 208 each time the aggregate size of the changes since the most recent change-based snap satisfies a predetermined threshold, e.g., N MB, where N is a static value selected as an implementation feature. It should be noted that change is not determined from the most recent snap of any policy, e.g., a periodic time-based snap policy. For example, if snap1 is a change-based snapshot and snap2 is a time interval-based snapshot, then snap3 would be a change-based snapshot capturing the changes from snap1 to snap3, not snap2 to snap3. The change is determined from the most recent snap of the same snap policy because snap2 has a different schedule, and may be terminated earlier than snap1 and snap3, resulting in the changes between snap1 and snap3 being larger than expected if the previously taken snapshot of any policy were used. The writes, and thus changes, may update existing LBAs, store data at previously empty LBAs, delete data from LBAs, and any combinations thereof. When generation of a new snapshot is prompted, the changes 210 (deltas) made to the storage object 200 since the most recent change-based snapshot 212 are written to the new snap volume 208. It is generally necessary to prepare a storage object to be snapped so the new snapshot is not necessarily generated instantaneously upon the threshold being satisfied. For example, new writes to the storage object may be halted and dirty data destaged to the managed drives before creating the new snap volume and sending snapshot deltas to the new snap volume. The change-based snap generation function is iterated such that new snapshots are generated each time the threshold is satisfied relative to the most recent snapshot (the new snapshot becomes the most recent snapshot once created). Because snap generation is change-based rather than periodic, the intervals of time represented by snaps of the storage object can differ. For example, snapshot 212 could include changes that occurred between time t22 and time t05, whereas snapshot 208 could include changes that occurred between time t26 and time t22, where the subscript numbers represent units of time. This advantageously decouples snap generation from elapsed time and promotes generation of snaps that are within a range of desirable size, e.g., neither so large that granularity is problematic nor so small that resource utilization is not justified by the value of the new snap. Different threshold values may be implemented for different snapped storage objects.

The amount of data that is changed can be computed in a variety of ways. For example, the actual size of data written by IOs can be used. Another technique is to compute data change at the storage object LBA level. For example, a write that changes only a portion of the data at an LBA may be counted as a change to the entire LBA, with the amount of changed data being the storage capacity of the LBA. Similarly, data change may be computed at the track level. For example, a write that changes only a portion of the data at a track may be counted as a change to the entire track, with the amount of changed data being the storage capacity of the track. Computing the amount of changed data at the LBA or track level of granularity may simplify tracking because uniform increments can be counted and determination of byte-level differences in size of IOs is not necessary. Updates to the same LBA or track may or may not be counted as single or multiple changes in accordance with design preference.

Figure 3:
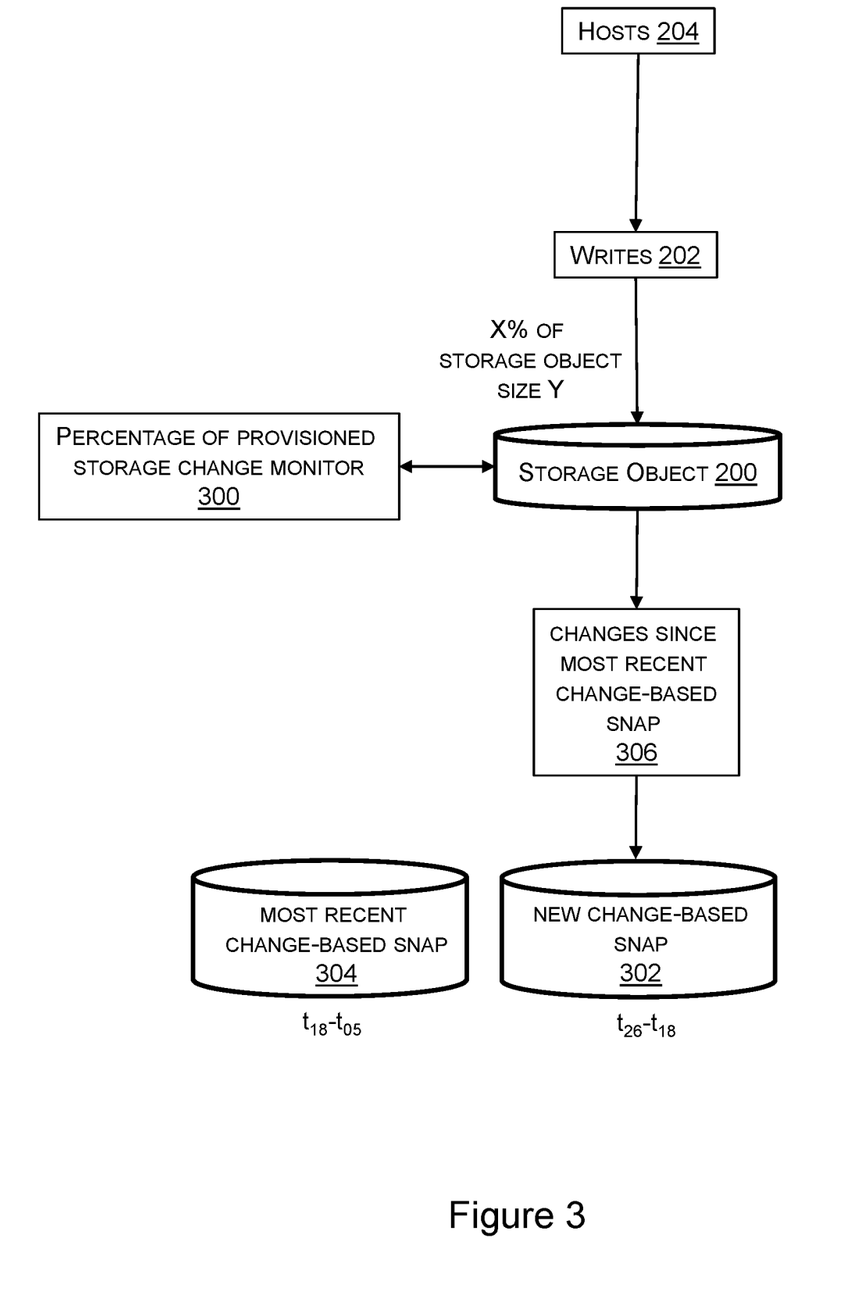
FIG. 3 illustrates snapshot generation based on percentage of provisioned storage capacity that has changed.

FIG. 3 illustrates snapshot generation based on the percentage of the provisioned storage capacity that has changed. Storage object 200 is changed by write IOs 202 received from hosts 204 as described above. A monitor 300 observes the writes to the storage object 200, computes the aggregate size of the changes, and prompts generation of a new snapshot 302 when the aggregate size of the changes as a percentage of the provisioned storage capacity of storage object 200 satisfies a predetermined threshold, e.g., X % of Y TB, where X is a static value selected as an implementation feature and Y is the provisioned size of the storage object, regardless of whether the storage object is thinly provisioned. When the aggregate size of the changes satisfies the threshold, the changes 306 made to the storage object since the most recent change-based snapshot 304 are written to the new snap volume 302. The function is iterated each time the threshold is satisfied relative to the most recent snapshot. Because snap generation is change-based rather than periodic, the interval of time represented by snaps of the storage object can represent different amounts of time.

Figure 4:
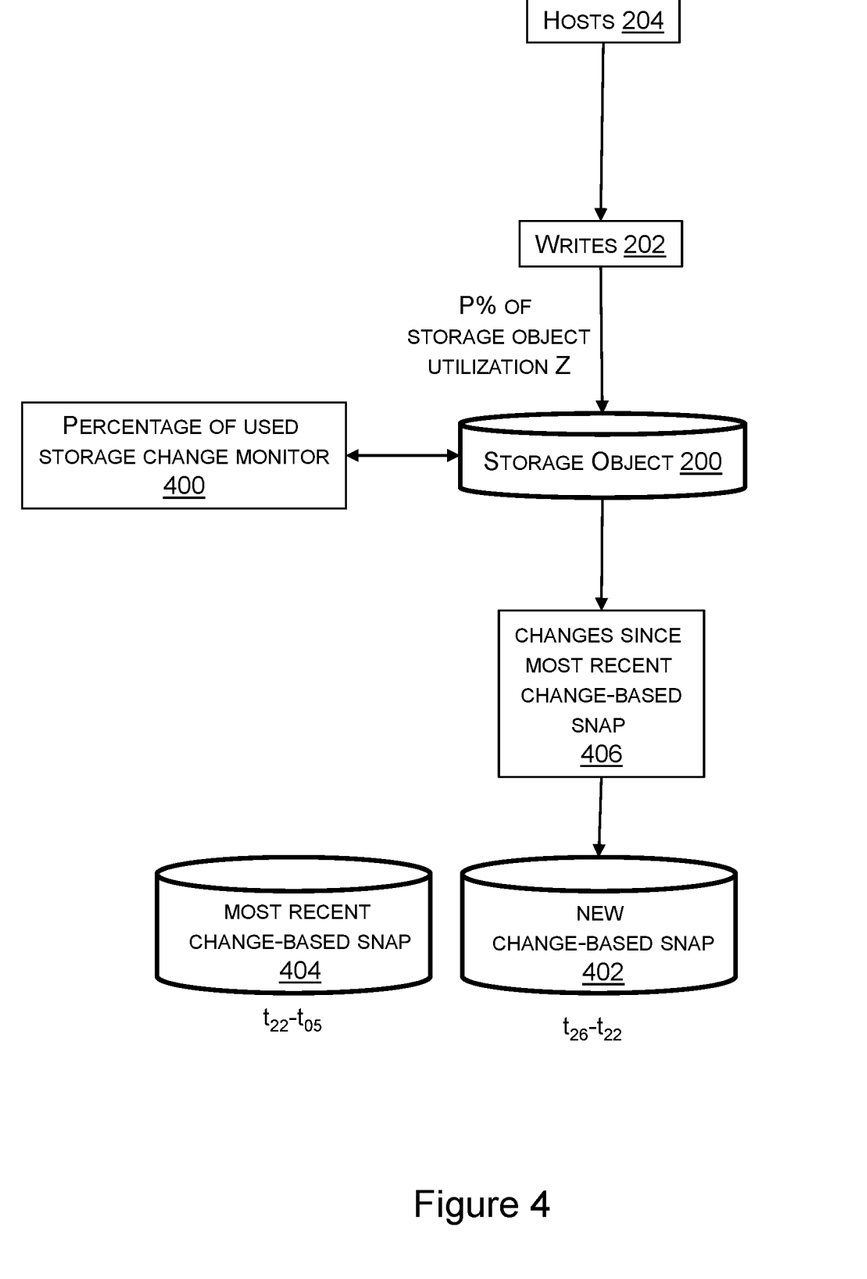
FIG. 4 illustrates snapshot generation based on percentage of utilized storage capacity that has changed.

FIG. 4 illustrates snapshot generation based on the percentage of utilized storage capacity that has changed. Storage object 200 is changed by write IOs 202 received from hosts 204 as described above. A monitor 400 observes the writes to the storage object 200, computes the aggregate size of the changes, and prompts generation of a new snapshot 402 when the magnitude of the changes in terms of percentage of utilized storage capacity of storage object 200 satisfies a predetermined threshold, e.g., P % of Z TB, where P is a static value selected as an implementation features and Z is the utilized storage capacity of the storage object. When the aggregate size of the changes satisfies the threshold, the changes 406 made to the storage object since the most recent change-based snapshot 404 are written to the new snap volume 402. The function is iterated each time the threshold is satisfied relative to the most recent snapshot. Because snap generation is change-based rather than periodic, the interval of time represented by snaps of the storage object can represent different amounts of time.

Figure 5:
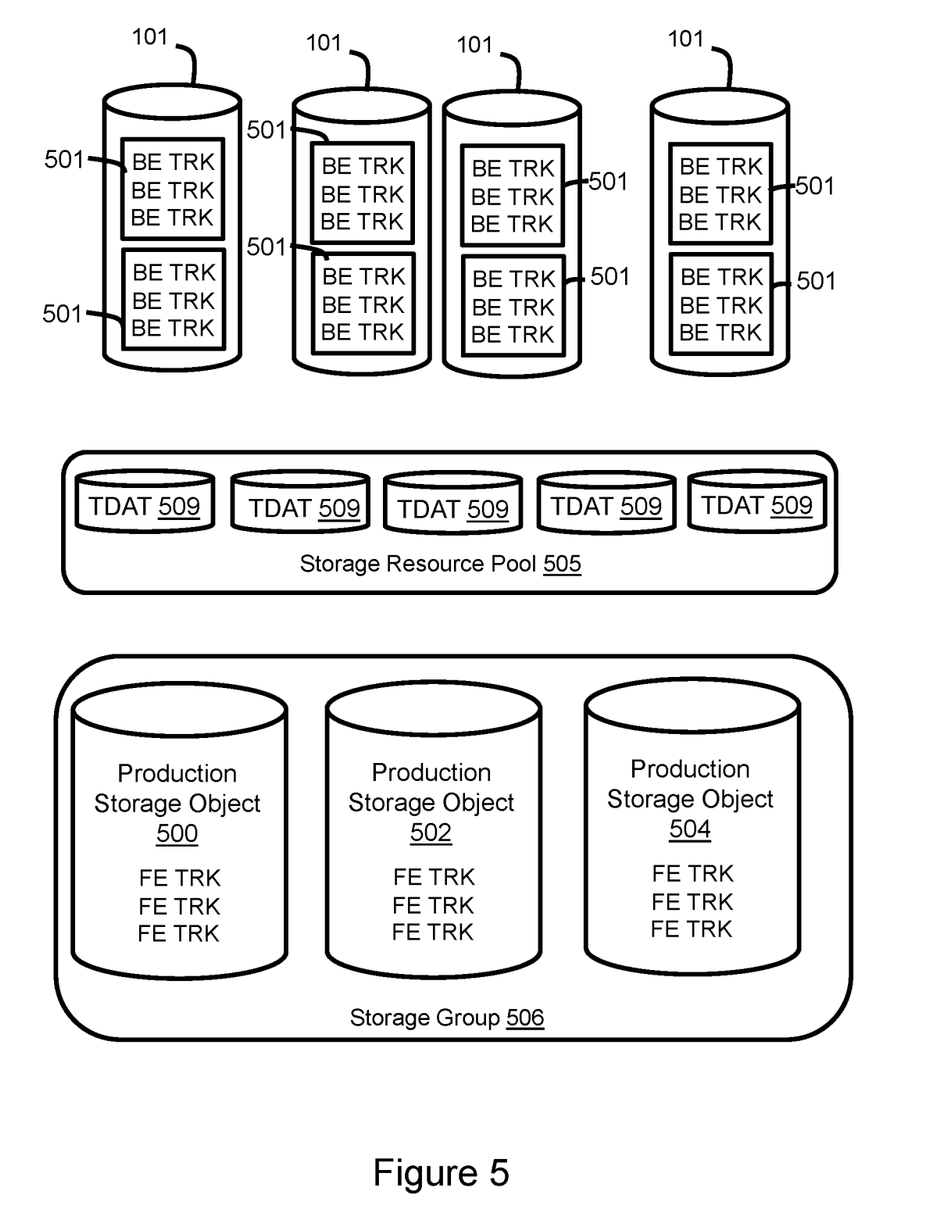
FIG. 5 illustrates a hierarchy of snappable storage objects maintained by the storage system.

FIG. 5 illustrates a hierarchy of snappable storage objects maintained by the storage system. As mentioned above, host application data that is logically stored on a storage object is physically stored on the managed drives 101 and the managed drives are not discoverable by the host servers, but storage objects are created that can be discovered by the host servers. Storage objects that can be discovered and accessed by the host servers are sometimes identified by the term "production," e.g., a production volume, production device, or production LUN. The basic allocation unit of storage capacity that is used by the compute nodes to access the managed drives 101 is a back-end track (BE TRK). The managed drives may be configured with partitions or splits 501, each of which may contain multiple BE TRKs. Groups of partitions or splits from different managed drives is used to create RAID protection groups. A storage resource pool 505 is a grouping of storage objects known as thin data devices (TDATs) 509 that contain RAID protection groups of the same type, e.g., RAID-5 (3+1). Storage resource pools are used to create production storage objects 500, 502, 504. The host application data is logically stored in front-end tracks (FE TRKs) on the production storage objects. The FE TRKs are mapped to the BE TRKs and vice versa by metadata that is maintained in shared memory of the compute nodes. Any of the storage objects may be snapped, e.g., the TDATs that are not discoverable by the hosts and the production storage objects that are discoverable.

Figure 6:
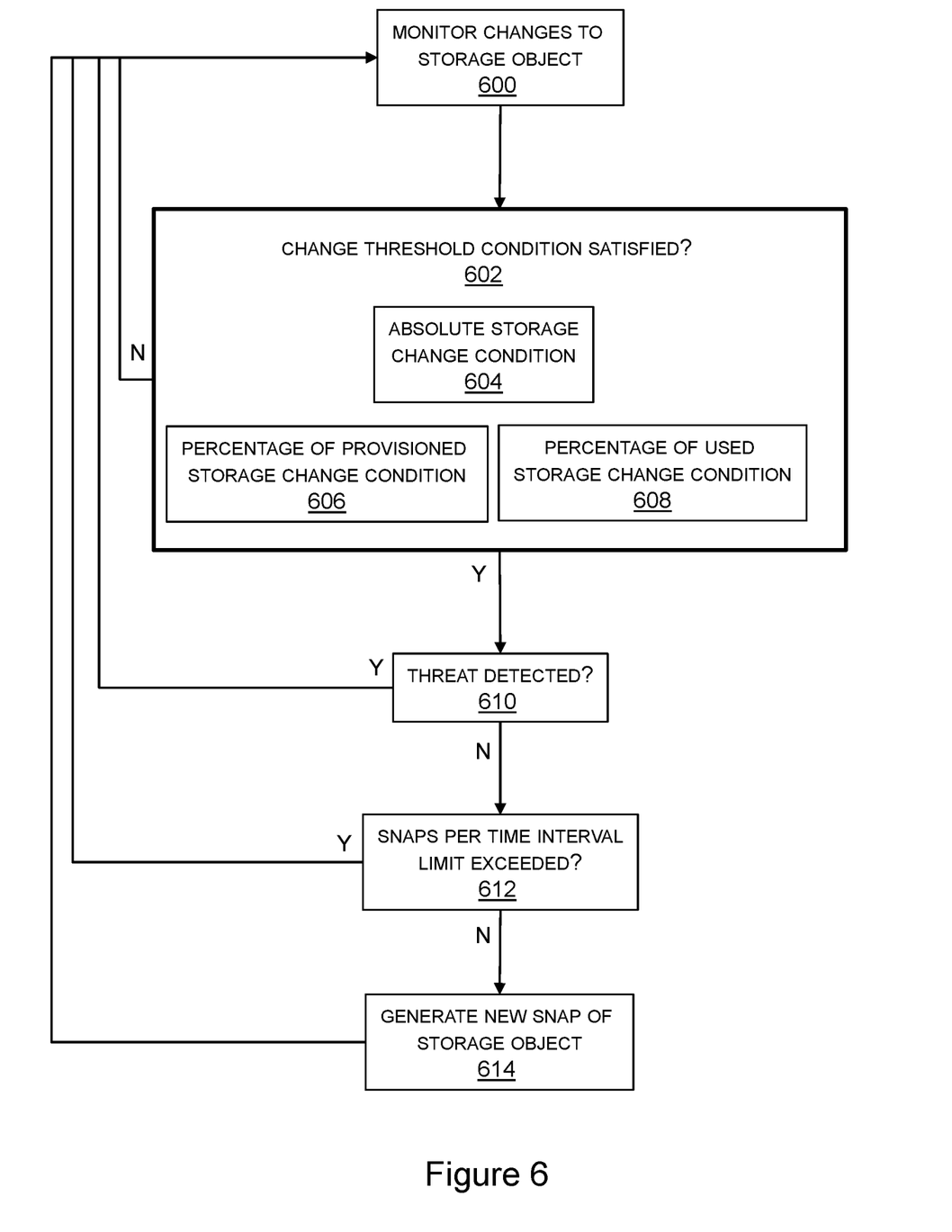
FIG. 6 illustrates a process implemented by the change-based snapshot generation engine and storage system.

FIG. 6 illustrates a process implemented by the change-based snapshot generation engine and storage system. Step 600 is monitoring changes to the storage object. Changes may include, but are not necessarily limited to, updates to existing LBAs, data written to previously empty LBAs, deletion of data from LBAs, and any combinations thereof. Step 600 includes computing the aggregate size of the changes to the storage object. Step 602 is determining whether a change threshold condition is satisfied. Any number of change threshold conditions could be specified for a storage object, so the three illustrated change condition steps 604, 606, 608 are not necessarily implemented together for a single storage object. Step 604 is determining whether an absolute storage change condition is satisfied. An absolute storage change condition is satisfied when the aggregate amount of changed data since the most recent snapshot satisfies a threshold that represents a predefined amount of storage capacity, e.g., N GB where N is a known static value. Step 606 is determining whether a percentage of provisioned storage change condition is satisfied. A percentage of provisioned storage change condition is satisfied when the aggregate size of the changes expressed as a percentage of the provisioned storage capacity of snapped storage object satisfies a predetermined threshold, e.g., X % of Y TB where X is a known static value and Y is the provisioned storage capacity. Step 608 is determining whether a percentage of used storage change condition is satisfied. A percentage of used storage change condition is satisfied when the aggregate amount of the changes in terms of percentage of utilized storage capacity of storage object satisfies a predetermined threshold expressed as a percentage of the utilized capacity of the storage object, e.g., P % of Z TB, where P is a known static value and Z is the utilized storage capacity of the storage object. Z must be ≤Y. If none of the change threshold conditions are satisfied, then monitoring of changes continues. If any of the change threshold conditions are satisfied, then step 610 is checking whether a threat detection condition is set. A threat, such as malicious access, may be associated with an unusual amount of data changes occurring, e.g., as data is encrypted or overwritten. If a threat detection condition is set, then monitoring of changes continues. If a threat condition is not set, then step 612 is determining whether a limit on the number of new snaps generated per interval of time is exceeded. As mentioned above, a threat, such as malicious access, may be associated with an unusual amount of data changes occurring. Consequently, an unusually large number of snaps generated per unit time period may be indicative of a threat even if a threat has not otherwise been detected. If the limit has been reached, then monitoring of changes continues. If the limit has not been reached, then step 612 is generating a new snapshot of the storage object. Monitoring of changes to the storage object then continues. In some implementations a maximum time threshold between snapshots is used to trigger snap generation if the change threshold has not been satisfied within the predetermined maximum time between snapshots. Old snapshots may be selected for deletion in accordance with a wide variety of known techniques in order to free storage space.

The change threshold conditions may be selected such that the sizes of snapshots is within a predetermined range calculated to yield sufficient granularity while also being large enough to justify the usage of resources to generate a new snap. Although the change-based snap generation engine has been described as being implemented in a SAN, it could be implemented in other types of storage nodes or outside of storage nodes, such as in a host server or management station. Usage of the change-based snap generation engine does not preclude usage of periodic snapshot schedulers. For example, and without limitation, periodic snapshot schedulers could be used for generation of remote snaps while the change-based snap generation engine is used for generation of local snaps.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   monitoring changes to a storage object since generation of a most recent snapshot of the storage object;
   computing whether the monitored changes satisfy a change threshold condition for the storage object;
   generating a new snapshot of the storage object in response to computing that the monitored changes satisfy the change threshold condition for the storage object; and
   continuing monitoring changes to the storage object without generating the new snapshot or a backup of the storage object in response to computing that the monitored changes fail to satisfy the change threshold condition for the storage object.

2. The method of claim 1 further comprising computing that aggregate size of changed data since generation of the most recent snapshot expressed in terms of storage capacity satisfies the change threshold condition.

3. The method of claim 1 further comprising computing that aggregate size of changed data since generation of the most recent snapshot expressed in terms of percentage of provisioned storage capacity of the storage object satisfies the change threshold condition.

4. The method of claim 1 further comprising computing that aggregate size of changed data since generation of the most recent snapshot expressed in terms of percentage of utilized storage capacity of storage object satisfies the change threshold condition.

5. The method of claim 1 further comprising delaying generating a new snapshot of the storage object in response to an indication of a threat being detected.

6. The method of claim 1 further comprising delaying generating a new snapshot of the storage object in response to an indication of a maximum number of allowed snapshots of the storage object during a unit time period has been reached.

7. The method of claim 1 further comprising designating a production storage object as the storage object.

8. An apparatus comprising:
non-volatile drives with storage space mapped to a storage object; and
snapshot generation program logic configured to:
monitor changes to the storage object since generation of a most recent snapshot of the storage object;
compute whether the monitored changes satisfy a change threshold condition for the storage object;
prompt generation of a new snapshot of the storage object in response to a determination that the monitored changes satisfy the change threshold condition for the storage object; and
continuing to monitor changes to the storage object without generating the new snapshot or a backup of the storage object in response to a determination that the monitored changes fail to satisfy the change threshold condition for the storage object.

9. The apparatus of claim 8 further comprising the snapshot generation program logic configured to compute that aggregate size of changed data since generation of the most recent snapshot expressed in terms of storage capacity satisfies the change threshold condition.

10. The apparatus of claim 8 further comprising the snapshot generation program logic configured to compute that aggregate size of changed data since generation of the most recent snapshot expressed in terms of percentage of provisioned storage capacity of the storage object satisfies the change threshold condition.

11. The apparatus of claim 8 further comprising the snapshot generation program logic configured to compute that aggregate size of changed data since generation of the most recent snapshot expressed in terms of percentage of utilized storage capacity of storage object satisfies the change threshold condition.

12. The apparatus of claim 8 further comprising the snapshot generation program logic configured to delay generation of a new snapshot of the storage object in response to an indication of a threat being detected.

13. The apparatus of claim 8 further comprising the snapshot generation program logic configured to delay generation of a new snapshot of the storage object in response to an indication of a maximum number of allowed snapshots of the storage object during a unit time period has been reached.

14. The apparatus of claim 8 further comprising a production storage object being designated as the storage object.

15. A non-transitory computer-readable storage medium storing instructions that when executed by a computer cause the computer to perform a method comprising:
monitoring changes to a storage object since generation of a most recent snapshot of the storage object;
computing whether the monitored changes satisfy a change threshold condition for the storage object;
generating a new snapshot of the storage object in response to computing that the monitored changes satisfy the change threshold condition for the storage object; and
continuing monitoring changes to the storage object without generating the new snapshot or a backup of the storage object in response to computing that the monitored changes fail to satisfy the change threshold condition for the storage object.

16. The non-transitory computer-readable storage medium of claim 15 in which the method further comprises computing that aggregate size of changed data since generation of the most recent snapshot expressed in terms of storage capacity satisfies the change threshold condition.

17. The non-transitory computer-readable storage medium of claim 15 in which the method further comprises computing that aggregate size of changed data since generation of the most recent snapshot expressed in terms of percentage of provisioned storage capacity of the storage object satisfies the change threshold condition.

18. The non-transitory computer-readable storage medium of claim 15 in which the method further comprises computing that aggregate size of changed data since generation of the most recent snapshot expressed in terms of percentage of utilized storage capacity of storage object satisfies the change threshold condition.

19. The non-transitory computer-readable storage medium of claim 15 in which the method further comprises delaying generating a new snapshot of the storage object in response to an indication of a threat being detected.

20. The non-transitory computer-readable storage medium of claim 15 in which the method further comprises delaying generating a new snapshot of the storage object in response to an indication of a maximum number of allowed snapshots of the storage object during a unit time period has been reached.

* * * * *